// United States Patent                [15]  3,671,654
Nosler et al.                           [45]  June 20, 1972

[54] SYNERGISTIC ANTIBACTERIAL AND ANTIFUNGAL COMPOSITIONS OF DMSO, ETHANOL OR METHANOL AND DIESTER OF 2,2,4-TRIMETHYLPENTANEDIOL-1,3

[72] Inventors: Heinz Gunter Nosler, Monheim Rhineland; Hararld Schnegelberger, Hilden Rhineland, both of Germany

[73] Assignee: Henkel & Cie GmbH, Dusseldorf-Holthausen, Germany

[22] Filed: June 11, 1968

[21] Appl. No.: 735,980

[30] Foreign Application Priority Data

Dec. 15, 1967  Germany..............................H 64793

[52] U.S. Cl..............................................424/312, 424/311
[51] Int. Cl. ..........................................A61k 27/00
[58] Field of Search..........................424/311–312

[56] References Cited

UNITED STATES PATENTS 3,551,554  12/1970  Herschler.................................424/7

OTHER PUBLICATIONS

Leiter, Career Research, Vol. 19, No. 6, July 1959, pages 309–315 and 370
Savage et al., Antimicrobial Agents and Chemotherapy, 1961, pages 807–810
Federal Register, Vol. 30, No. 220, Nov. 25, 1965, page 14035
Ferm, The Lancet, Jan. 22, 1966, pages 208–9.
Rubin et al., Science 153, July 1, 1966, pages 83–4

*Primary Examiner*—Albert T. Meyers
*Assistant Examiner*—Daren M. Stephens
*Attorney*—Hammond & Littell

[57]                ABSTRACT

Novel antifungal and antibacterial agents having a short-kill time comprising dimethyl sulfoxide, ethanol or isopropanol and an effective amount of at least one diester of 2,2,4-trimethylpentanediol-1,3 and aliphatic carboxylic acids of two to 12 carbon atoms.

13 Claims, No Drawings

SYNERGISTIC ANTIBACTERIAL AND ANTIFUNGAL COMPOSITIONS OF DMSO, ETHANOL OR METHANOL AND DIESTER OF 2,2,4-TRIMETHYLPENTANEDIOL-1,3

STATE OF THE ART

The diacetate of propanediol-1,2 is described in Antimicrobial Agents Chemotherapy by Seneca et al., 1961, pp. 807–810, as being an effective fungicidal and bactericidal compound. However, the degree of fungicidal activity of this compound is such that it has to be used in comparatively high concentrations which are unsatisfactory for application to skin tissue.

In the commonly assigned U.S. Pat. application Ser. No. 735,981, now U.S. Pat. No. 3,574,848 filed concurrently herewith in the name of Harald Schnegelberger and Horst Bellinger entitled "Fungicides", there are described antibacterial and antifungal compositions having as the active ingredient an effective amount of at least one diester of 2,2,4-trimethylpentanediol-1,3 and aliphatic carboxylic acids of two to 12 carbon atoms. The said compositions have the advantage of having a strong antifungal effect at low concentrations of the active ingredient with a good protection of skin tissue against fungus growth. While this fungus destroying activity is completely satisfactory, the said compositions require in some cases a prolonged contact time for killing fungi which is not true of some other known antifungal agents.

OBJECTS OF THE INVENTION

It is an object of the invention to provide novel fungicidal and bactericidal compositions having a quick kill time.

It is another object of the invention to provide an improved method of killing fungi and bacteria.

These and other objects and advantages of the invention will become obvious from the following detailed description.

THE INVENTION

The novel antifungal and antibacterial agents of the invention are comprised of 5 to 30 percent by weight of an alcohol selected from the group consisting of ethanol and isopropanol, 10 to 50 percent by weight of dimethylsulfoxide, 0.0001 to 5 percent by weight of at least one diester of 2,2,4-trimethylpentanediol-1,3 and an aliphatic carboxylic acid of two to 12 carbon atoms and a non-toxic carrier. Preferred amounts of the ingredient are 10 to 20 percent by weight of the alcohol, 20 to 40 percent by weight of dimethylsulfoxide and 0.001 to 1.0 percent by weight of the diesters.

The aliphatic carboxylic acids for the diesters of 2,2,4-trimethylpentanediol-1,3 may be straight chain or branch chain or saturated or unsaturated. Examples of specific acids are acetic acid, propionic acid, butyric acid, isobutyric acid, n-valeric acid, isovaleric acid, caproic acid, enanthic acid, caprylic acid, pelargonic acid, capric acid, lauric acid, acrylic acid, crotonic acid, angelic acid, undecylenic acid, teranic acid, propiolic acid, etc. The preferred ester is the diacetate due to its very high degree of activity.

The said diesters may be made in any known fashion for preparing esters such as reacting 2,2,4-trimethylpentanediol-1,3 with an acid chloride in an organic solvent such as benzene in the presence of a tertiary amine such as pyridine or with an acid anhydride in the presence of an acid catalyst such as p-toluene sulfonic acid.

The antifungal and antibacterial activity of the said compositions is due to the diesters of 2,2,4-trimethylpentanediol-1,3 and the presence of the dimethylsulfoxide and the ethanol or isopropanol surprisingly shortens the killing contact time of the compositions which makes them useful for applications in which the diesters per se are not sufficiently effective.

The compositions of the invention are preferably in the form of solutions, tinctures, aerosol sprays or other liquid forms and the preferred non-toxic carrier is water.

The novel method of the invention for killing fungi and bacteria comprises contacting bacteria and fungi with an effective amount of a composition comprised of ethanol or isopropanol, dimethylsulfoxide and 0.0001 to 5 percent by weight of at least one diester of 2,2,4-trimethylpentanediol-1,3 and an aliphatic carboxylic acid of two to 12 carbon atoms. The said method is particularly effective when applied topically to skin tissue but may also be used in other ways such as by washing clothes, floors, walls, dishes etc. with compositions containing the said three-component system.

In the following examples, there are described several preferred embodiments to illustrate the invention. However, it should be understood that the invention is not intended to be limited to the specific embodiments.

EXAMPLE I 0.2 moles of 2,2,4-trimethylpentanediol-1,3 and 0.8 moles of acetic acid anhydride in the presence of 0.2 gm of p-toluene sulfonic acid as catalyst were heated for 5 hours at 120°–130° C. Fractional distillation of the resulting product resulted in a 93 percent yield of the diacetate of 2,2,4-trimethylpentanediol-1,3 having a boiling point of 117°–120° C. at 14 mm Hg.

EXAMPLE II 0.2 moles of 2,2,4-trimethylpentanediol-1,3 and 0.6 moles of propionic acid anhydride were refluxed for 8 hours in the presence of 0.2 gm of p-toluene sulfonic acid. Fractional distillation of the resulting product gave a 75 percent yield of the dipropionate of 2,2,4-trimethylpentanediol-1,3 having a boiling point of 131°–132° C. at 14 mm Hg.

EXAMPLE III 0.2 moles of 2,2,4-trimethylpentanediol-1,3 and 0.6 moles of butyric acid anhydride in the presence of 0.2 gm of p-toluene sulfonic acid were refluxed for 8 hours. Fractional distillation of the product gave a 71 percent yield of the dibutyrate of 2,2,4-trimethylpentanediol-1,3 having a boiling point of 159°–160° C. at 14 mm Hg.

Using the same procedure, the dicapronic and dilaurate esters of 2,2,4-trimethylpentanediol-1,3 were prepared and all the said diesters were used for the following examples.

EXAMPLE IV

The threshold concentrations of the esters of Examples I to III were determined by the so-called plate test. This variation of the dilution test for chemical disinfectants set up by Deutsche Gesellshaft für Hygene und Mikrobiologie has the advantage of using a solid culture media instead of a liquid culture media. Solid culture media have the advantage of being able to easily discern the effectiveness, particularly for fungicides.

The desired test concentrations were prepared by mixing specific amounts of the substance solutions of suitable concentrations with specific amounts of liquid bouillon or beer-worst agars, in sterile petri-dishes. The amounts, measured with a pipette, of the substance solutions were a maximum of 0.1 to 1 ml and the total volume in the petri-dishes after admixing with the culture media amounted to 10 ml.

After solidification of the culture media, its surface was inoculated with the test germ suspension in bouillon or wort, which contained about $10^8$ germs per ml. The incubation took place at 37° C. or at 30° C. in the incubator, and lasted 8 days when bacterial Candida albicans was employed. When Epidermophyton Kaufmann-Wolf was used, it lasted 21 days. The duration of incubation of 21 days for Epidermophyton Kaufmann-Wolf was chosen to conform to the above standard test, because in the evaluation of disinfectants against fungi of the epithelium, a substance is considered as suitable when the growth of the fungi after predetermined durationof action is delayed by at least 21 days. Therefore, it was ascertained which of the substance concentrations worked into the culture media was just about capable to arrest the growth of the test germs completely. This value thus ascertained was indicated as threshold concentration. The tests were carried out in varying concentration intervals.

If the tested diester composition did not contain alcohol, it was tested with a solution containing acetone. In the following tables, the concentrations and the destruction times for the compositions tested are reported. The diacetate is compound A; the dipropionate is compound B; the dibutyrate is compound C; the dicaproate is compound D and the dilaurate is compound E.

TABLE I

[Candida albicans]

| Ingredients in composition | Amount of ingredient, percent by weight | Diesters | | | | |
|---|---|---|---|---|---|---|
| | | A | B | C | D | E |
| Isopropanol | 10 | (*) | (*) | (*) | (*) | (*) |
| | 20 | (*) | (*) | (*) | (*) | (*) |
| Diester | 0.1 | (*) | (*) | (*) | (*) | (*) |
| | 0.5 | (*) | (*) | (*) | (*) | (*) |
| Dimethylsulfoxide (DMSO) | 40 | (*) | (*) | (*) | (*) | (*) |
| Isopropanol diester | 10 / 0.1 | (*) | (*) | (*) | (*) | (*) |
| Do | 10 / 0.5 | (*) | (*) | (*) | (*) | (*) |
| Do | 20 / 0.1 | (*) | (*) | (*) | (*) | (*) |
| Do | 20 / 0.5 | (*) | (*) | (*) | (*) | (*) |
| DMSO diester | 40 / 0.1 | (*) | (*) | (*) | (*) | (*) |
| Do | 40 / 0.5 | (*) | (*) | (*) | (*) | (*) |
| Isopropanol diester DMSO | 10 / 0.1 / 40 | 10 | (*) | (*) | (*) | (*) |
| Do | 10 / 0.5 / 40 | 3 | 5 | 5 | 10 | 10 |
| Do | 20 / 0.1 / 40 | 3 | 10 | 5 | 10 | 5 |
| Do | 20 / 0.5 / 40 | 0.5 | 0.5 | 0.5 | 0.5 | 1 |

*=No destruction during 10 minutes.
Test temperature, 20° C.
Statement of destruction periods (in minutes).

TABLE II

[Epidermophyton Kaufmann-Wolf]

| Ingredients in composition | Amount of ingredient, percent by weight | Diesters | | | | |
|---|---|---|---|---|---|---|
| | | A | B | C | D | E |
| Isopropanol | 10 | (*) | (*) | (*) | (*) | (*) |
| | 20 | (*) | (*) | (*) | (*) | (*) |
| Diester | 0.05 | (*) | (*) | (*) | (*) | (*) |
| | 0.1 | (*) | (*) | (*) | (*) | (*) |
| Dimethylsulfoxide (DMSO) | 40 | (*) | (*) | (*) | (*) | (*) |
| Isopropanol diester | 10 / 0.05 | (*) | (*) | (*) | (*) | (*) |
| Do | 10 / 0.01 | (*) | (*) | (*) | (*) | (*) |
| Do | 20 / 0.05 | (*) | (*) | (*) | (*) | (*) |
| Do | 20 / 0.1 | (*) | (*) | (*) | (*) | (*) |
| DMSO diester | 40 / 0.05 | (*) | (*) | (*) | (*) | (*) |
| Do | 40 / 0.1 | (*) | (*) | (*) | (*) | (*) |
| Isopropanol diester DMSO | 10 / 0.05 / 40 | 5 | (*) | (*) | 10 | 10 |
| Do | 10 / 0.1 / 40 | 3 | 5 | 10 | 10 | 5 |
| Do | 20 / 0.05 / 40 | 0.5 | 1 | 3 | 3 | 3 |
| Do | 20 / 0.1 / 40 | 0.5 | 0.5 | 0.5 | 0.5 | 0.5 |

*=No destruction within 10 minutes.
Test temperature, 20° C.
Statement of destruction periods in minutes.

TABLE III

[Candida albicans]

| Ingredients in composition | Amount of ingredient, percent by weight | Diesters | | | | |
|---|---|---|---|---|---|---|
| | | A | B | C | D | E |
| Ethanol | 10 | (*) | (*) | (*) | (*) | (*) |
| | 20 | (*) | (*) | (*) | (*) | (*) |
| Diester | 0.5 | (*) | (*) | (*) | (*) | (*) |
| Dimethylsulfoxide (DMSO) | 40 | (*) | (*) | (*) | (*) | (*) |
| Ethanol diester | 10 / 0.5 | (*) | (*) | (*) | (*) | (*) |
| Do | 20 / 0.5 | (*) | (*) | (*) | (*) | (*) |
| DMSO diester | 40 / 0.5 | (*) | (*) | (*) | (*) | (*) |
| Ethanol diester DMSO | 10 / 0.5 / 40 | 5 | 5 | 10 | 10 | 10 |
| Do | 20 / 0.5 / 40 | 0.5 | 0.5 | 0.5 | 1 | 1 |

*=No destruction during 10 minutes.
Test temperature, 20° C.
State of destruction periods in minutes.

TABLE IV

[Candida albicans]

| Ingredients in composition | Amount of ingredient, percent by weight | Diesters | | | | |
|---|---|---|---|---|---|---|
| | | A | B | C | D | E |
| Isopropanol | 20 | (*) | (*) | (*) | (*) | (*) |
| Diester | 0.5 | (*) | (*) | (*) | (*) | (*) |
| Dimethylsulfoxide (DMSO) | 10 | (*) | (*) | (*) | (*) | (*) |
| | 20 | (*) | (*) | (*) | (*) | (*) |
| | 30 | (*) | (*) | (*) | (*) | (*) |
| Isopropanol diester | 20 / 0.5 | (*) | (*) | (*) | (*) | (*) |
| DMSO diester | 10 / 0.5 | (*) | (*) | (*) | (*) | (*) |
| Do | 20 / 0.5 | (*) | (*) | (*) | (*) | (*) |
| Do | 30 / 0.5 | (*) | (*) | (*) | (*) | (*) |
| Isopropanol diester DMSO | 20 / 0.5 / 10 | 10 | (*) | (*) | (*) | (*) |
| Do | 20 / 0.5 / 20 | 1 | 3 | 5 | 5 | 3 |
| Do | 20 / 0.5 / 30 | 0.5 | 0.5 | 0.5 | 1 | 1 |

* =No destruction during 10 minutes.
Test temperature, 20° C.
Statement of destruction periods in minutes.

Tables I to IV clearly show that the use of the three different ingredients alone or any combination of two ingredients does not result in a shortening of the kill contact time but that it is only when the three components are combined together that the kill contact time is sharply reduced due to the synergistic activity of the combination. Moreover, the compositions of the invention have a much higher degree of activity against bacteria than the diester alone.

PHARMACEUTICAL COMPOSITIONS

A. Antimycotic solutions

| | Parts by weight |
|---|---|
| Diacetate of 2,2,4-trimethyl-pentanediol-1,3 | 0.4 |
| Isopropanol | 20.0 |
| Dimethylsulfoxide | 20.0 |
| Water | 60.0 |

B. Antimycotic tincture

| | |
|---|---|
| Diacetate of 2,2,4-trimethyl-pentanediol-1,3 | 0.5 |
| Ethanol | 20.0 |
| Dimethylsulfoxide | 40.0 |
| Hydrocortisone | 0.5 |
| Water | 40.0 |

C. Antimycotic spray

| | |
|---|---|
| Diacetate of 2,2,4-trimethyl-pentanediol-1,3 | 0.3 |
| Isopropanol | 15.0 |
| Dimethylsulfoxide | 25.0 |
| Water | 60.0 |
| Propellent gas | 100.0 |

Various modifications of the compositions and method of the invention may be made without departing from the spirit or scope thereof and it is to be understood that the invention is to be limited only as defined in the appended claims.

We claim:

1. A composition for killing fungi and bacteria which comprises 5 to 30 percent by weight of an alcohol selected from the group consisting of ethanol and isopropanol, 10 to 50 percent by weight of dimethylsulfoxide, 0.0001 to 5 percent by weight of at least one diester of 2,2,4-trimethylpentanediol-1,3 and an aliphatic carboxylic acid of two to 12 carbon atoms and a non-toxic carrier.

2. The composition of claim 1 containing 0.001 to 1 percent by weight of the diester.

3. The composition of claim 1 containing 10 to 20 percent by weight of the alcohol.

4. The composition of claim 3 wherein the alcohol is ethanol.

5. The composition of claim 3 wherein the alcohol is isopropanol.

6. The composition of claim 1 containing 20 to 40 percent by weight of dimethylsulfoxide.

7. The composition of claim 1 wherein the aliphatic carboxylic acid is a monocarboxylic acid.

8. The composition of claim 1 wherein the diester is the diacetate.

9. A method of killing fungi and bacteria which comprises contacting fungi and bacteria with an effective amount of a composition of claim 1.

10. The method of claim 9 wherein the composition contains 10 to 20 percent by weight of the alcohol, 20 to 40 percent by weight of dimethylsulfoxide and 0.001 to 1.0 percent by weight of the diesters.

11. The method of claim 9 wherein the alcohol is ethanol.

12. The method of claim 9 wherein the alcohol is isopropanol.

13. The method of claim 9 wherein the diester is the diacetate.

* * * * *